United States Patent
Hase

[11] 3,931,565
[45] Jan. 6, 1976

[54] INVERTERS

[76] Inventor: Alfred Max Hase, 6 Manorwood Road, Scarborough, Ontario, Canada

[22] Filed: Oct. 3, 1974

[21] Appl. No.: 511,789

[52] U.S. Cl. .............................. 321/45 R; 321/45 C
[51] Int. Cl.² ...................................... H02M 7/515
[58] Field of Search ....... 321/18, 43, 44, 45 R, 45 C

[56] References Cited
UNITED STATES PATENTS

| | | | |
|---|---|---|---|
| 3,259,827 | 7/1966 | Strohmeier et al. | 321/45 R X |
| 3,317,816 | 5/1967 | Wilting | 321/45 R |
| 3,340,453 | 9/1967 | Bradley et al. | 321/45 C |
| 3,349,314 | 10/1967 | Giannamore | 321/45 C |
| 3,365,636 | 1/1968 | Baker | 321/45 R X |
| 3,366,866 | 1/1968 | King | 321/45 R X |
| 3,378,752 | 4/1968 | Naylor | 321/45 R X |
| 3,379,955 | 4/1968 | Koetsch | 321/45 R |
| 3,412,309 | 11/1968 | Boonstra | 321/45 R X |

Primary Examiner—William M. Shoop
Attorney, Agent, or Firm—Donald E. Hewson

[57] ABSTRACT

An inverter circuit, having a dc input and an ac output, has an input circuit portion which includes an isolating diode and an input filter including a choke and a polarized capacitor across the dc input. The dc-chopper portion of the inverter circuitry may either be centre-tapped — where half of the primary winding is in the circuit at any time — or bridge-type — where all of the primary winding is in the circuit. In any event, the chopper portion uses SCR's, and has 180 electrical degree commutation; with a commutation capacitor across the primary winding of the output transformer and a commutation choke in series with the SCR's. Feedback is provided by feedback diodes which may be connected to taps on the primary winding of the transformer, or which may be in parallel with the commutation choke, and which in any event are connected in counter-polarity to the polarized input capacitor. The SCR's of the chopper circuitry may be isolated by diodes in series with them, from the primary winding of the output transformer.

22 Claims, 18 Drawing Figures

FIG. 1

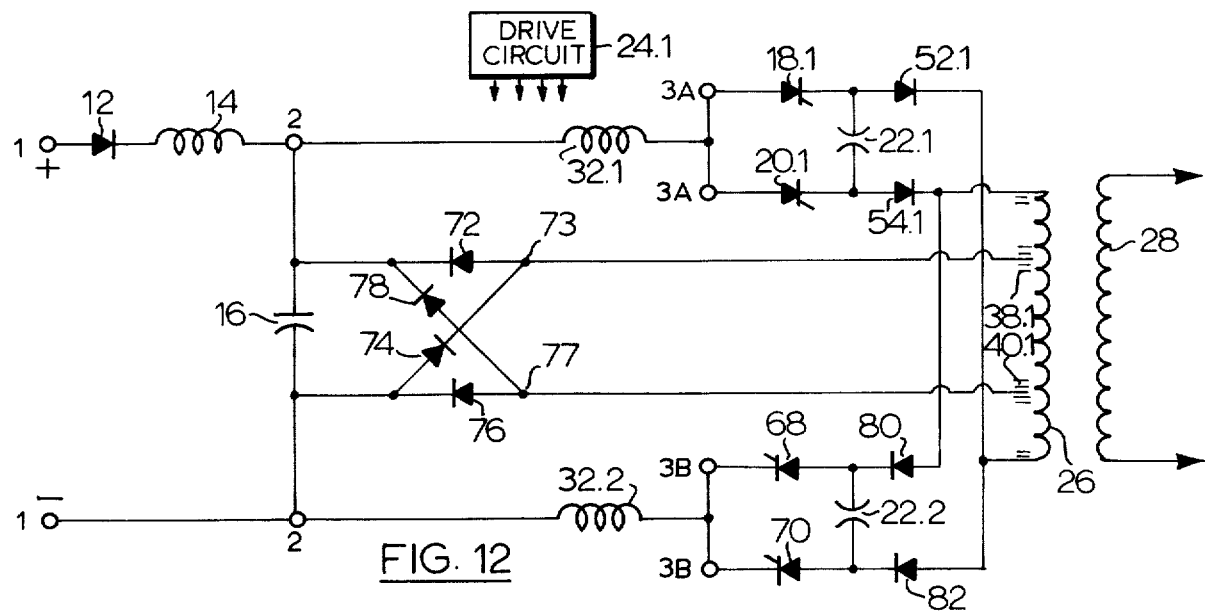
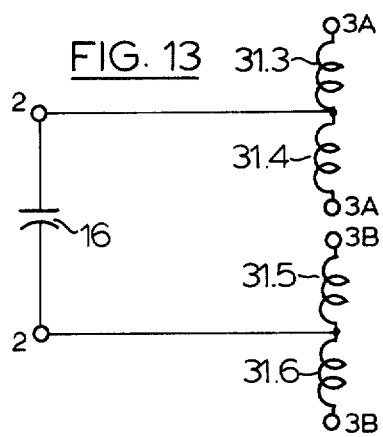
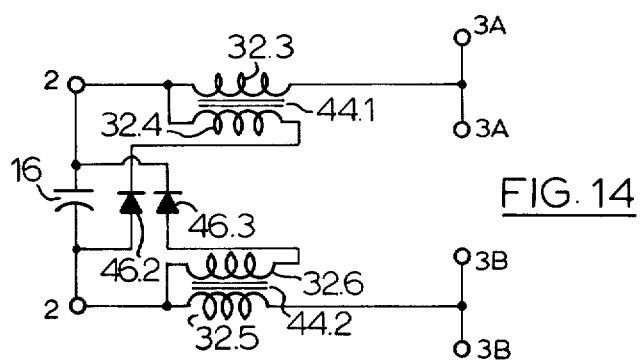
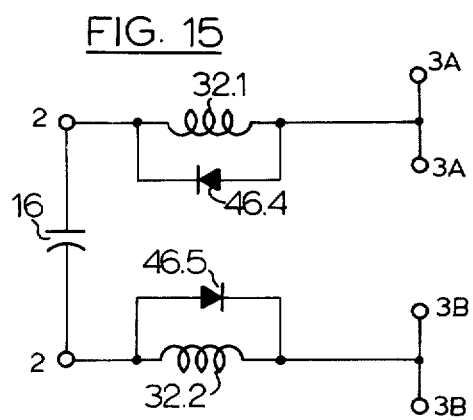
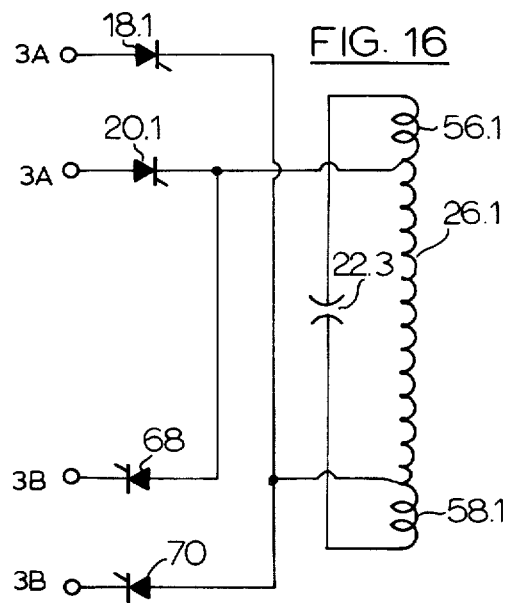

INVERTERS

FIELD OF THE INVENTION

This invention relates to inverter circuitry whereby direct current input is converted to an alternating current output; and in particular, this invention teaches circuits for inverters having 180 electrical degree fixed firing, with direct current commutation, where the commutation and frequency of the circuit are independent of the load conditions on the inverter. A feature of the present invention is that inverter circuits according hereto have closed loop feedback which is electrically isolated from the inverter load.

BACKGROUND OF THE INVENTION

It has long been known to convert dc power to ac power; and such power converters — known as inverters — which convert constant voltage, regulated dc to ac, using SCR's, have been known. However, SCR operated inverters having very high power ratings at low, industrial frequencies (generally 60 Hz or 400 Hz) have tended to be unstable or to have wide frequency variations beyond an acceptable level. Inverters of the prior art have included circuitry having closed loop feedback control where the ac output is sensed and the dc firing is controlled thereby, and have included generations of inverters having phase angle controlled firing, pulse modulated firing, and pulse modulated and phase angle controlled with pulse shaping, etc. For example, the firing angle of transistors or triacs used in a dc-chopper circuit may be controlled so as to assure a constant average output voltage, such as by controlling the pulse width and/or the pulse amplitude, while sensing the ac output and controlling the chopper having the dc input. It is usual, in the prior art inverter technology, to provide combination LC series/parallel resonant ac waveform filters or, in the case of pulse modulated firing, capacitor filters.

However, the prior art inverter circuitry such as that discussed above, has had a number of disadvantages. For example, in using capacitor filters with inverters having other than the very smallest power ratings, filter banks which are physically very large have been required. More especially, however, is the fact that while the electronic sensing of the ac output of an inverter is very fast, and control of SCR firing can be equally as fast — in the order of a few milliseconds — the response time of a series/parallel LC filter may be quite sluggish in comparison — in the order of three to thirty cycles of inverter operation, depending upon frequency and power rating. If the inverter is subject to a dynamic load, i.e. one which may vary rapidly as to its power requirements or its power factor, or if the inverter circuit is subject to fluctuations or sudden changes in its dc input voltage level, the ac output voltage may vary considerably in level and, indeed, in frequency. What may happen, therefore, is that the ac output may tend to overshoot or undershoot, the ac output may ring or the chopper output may ring, hunting may occur and feedback loop instability results. The output may then collapse, the SCR's may misfire, and the inverter fails.

In addition, as the load on an inverter changes or its power factor changes, which may be following by a period of ringing of the inverter output or instability of the feedback and control loops within the inverter, there may be very high power radio frequency noise generated in the dc-chopper. Additionally, the firing circuit for the SCR's in the chopper may, itself, become subject to RF interference.

In the instance when two or more inverters may be connected in parallel, reliability and stability problems are encountered because, for example, it is difficult to predict the precise manner in which an inverter output may ring, or to overcome or suppress loop instabilities. In addition, difficulties occur when two or more inverters are either connected to the same dc source, or even when a single inverter is switched from one dc source to another having a slightly different level. To overcome some of these difficulties, designers have been obliged to assure that each inverter has its own dc supply and that no other noise creating dc loads are connected to that supply.

In addition, none of the prior art inverters provide inherent current limiting and short circuit proof performance; and current limiting in such inverters must be established electronically. This means, of course, that in the case of an electronic failure, SCR's might be short circuited, and diodes and fuses can be overloaded, and damage of failure to the inverter occurs; which, in any event, requires a period of non-operating time for repair or replacement.

Akamatsu, in U.S. Pat. No. 3,683,267 issued Aug. 8, 1972, teaches a power control system having an inverter which includes at least two thyristors or SCR's, and where a non-linear reactor is connected in series with each thyristor. A commutating capacitor is connected between the thyristors, and at any instant one of the thyristors is fired so as to apply the voltage which is accumulated on the commutator capacitor to the other of the thyristors, in the reverse bias direction, so as to effect commutation. However, the Akamatsu circuits are particularly adapted for use at relatively high operating frequencies, and are devised so as to reduce commutation current and absorption of feedback power, thereby increasing the efficiency of the inverter. The Akamatsu circuits, however, do not lend themselves to parallel operation, either from different sources or from the same source; and the circuits are such that the output may, under rapidly changing load conditions, have a high harmonic content.

Wurst, et al, in U.S. Pat. No. 3,702,432 issued Nov. 7, 1972, teach an inverter which uses SCR's, and where bifilar choke is used having one winding in series with each of the SCR's and off the end of a centre-tapped output transformer so as to prolong the discharge time of the commutation capacitor and thereby prevent high peak currents during commutation. The Wurst et al circuits, however, not only require the use of a special choke — rather than "off-the-shelf" components — but the Wurst et al circuit may tend to have frequency instability.

What applicant does herein, is to provide a group of inverter circuits — which may operate either with a centre-tapped transformer connected to a dc-chopper or with a bridge-type chopper across a transformer — and which in any event have high reliability and a completely isolated dc input circuit from the ac output circuit, including an isolated dc feedback loop. The circuits of the present invention have choppers which operate over 180 electrical degrees on each side so that the inverter output frequency is substantially constant and is independent either of the load or of the input dc voltage.

The circuits of the present invention are particularly adapted to be operated with a ferroresonant voltage regulating circuit of the sort which is taught in applicant's U.S. Pat. No. 3,824,449. In the circuits of the present invention, the commutation capacitor may be decoupled from the dc-chopper transformer, by means of series diodes; and in such circuits, because the 180 electrical degree commutation effectively frees the inverter from effects of changes of power factor of the load, current and voltage stresses within the commutation circuits of the inverter are substantially constant and are predictable.

Other features of the present invention are the inclusion of input circuitry which limits in-rush current and permits very fast start up of the inverter. Such "soft start" circuitry creates less stress on the dc power source, and on the components in the commutation circuits.

Thus, the present invention comprises an inverter circuit, as described above, having the combination of at least:

a. an input diode connected to the dc source for the inverter, and having its polarity arranged so as to be normally conductive;
b. an input filter choke in series with the dc input and the input diode;
c. an input, polarized capacitor across the dc input;
d. a pair of SCR's facing in the same direction with respect to the input and having an unpolarized commutation capacitor facing the SCR's on the side of each thereof which is remote from the dc source;
e. a drive circuit for the SCR's arranged so that, at any time, one or the other of the SCR's is conductive;
f. a transformer — which is essentially a dc-chopper transformer — arranged with its primary winding connected so that at any instant of time at least a portion of the primary winding is in series with the SCR which is conductive at that instant — the ac output of the basic inverter circuitry being taken from the secondary winding of the transformer;
g. a pair of de-coupling diodes, each connected to the primary winding of the transformer so as to have 100% of that winding between their connection points, with the other sides of each of the de-coupling diodes being connected in series to one each of the SCR's; the unpolarized commutation capacitors being connected between the common points of the series connection of the pairs of SCR's and de-coupling diodes;
h. a commutation choke in series with the SCR's and connected in such a manner that each of the SCR's is in series with at least a portion of the commutation choke;
i. and a feedback circuit which comprises at least one diode arranged in counter polarity to the polarized input capacitor and connected to the opposite polarity side of the polarized input capacitor, with the other side of the diode facing the primary winding of the transformer.

The above is a basic description of the principle arrangement of basic circuits according to the present invention. For example, a dc-chopper transformer may be a centre-tapped transformer where each of the SCR's faces one or the other of the ends of the primary winding of the transformer, and the primary winding is centre-tapped to one side of the dc input; or the dc-chopper may be of the bridge variety having two pairs of SCR's where both SCR's of each pair face in the same direction and the pairs are oppositely faced with respect to the dc input, and where each of the SCR's in each pair faces one or the other of the ends of the primary winding of the transformer. In the latter circumstances — i.e., in the case of a bridge-type dc-chopper — one or the other of each of the pairs of SCR's is conductive at any instant of time, in a manner so that both ends of the primary winding of the dc-chopper transformer face a conductive SCR at all times.

A number of variations with respect to the basic circuits according to this invention are discussed hereafter. Such variations include direct-coupled commutation capacitors, soft-start input circuits, forced commutation of both centre-tapped chopper circuits and bridge-type chopper circuits, alternative feedback arrangements, etc.

BRIEF SUMMARY OF THE INVENTION

The major purpose of this invention is to provide improved inverter circuitry which may be used in single or multi phase, at relatively low frequencies and with high power ratings, where the circuits themselves may be built up from substantially "off-the-shelf" components and have high reliability — i.e., high MTBF (Mean Time Between Failures) rating — for such purposes as remote installations or installations with delicate power loads such as computers or telecommunications equipment.

A feature of the present invention is that dc-chopper circuits of either the centre-tapped or bridge-type design may be utilized, while retaining the principles of operation of the basic circuit concepts, including improved input circuitry and completely isolated feedback circuitry.

An object of this invention is, therefore, to provide inverter circuitry such that the dc-chopper is substantially independent of the load, and that its operation is substantially independent of load or power factor changes in the ac output.

A still further object of the present invention is to provide an inverter having very low noise and low harmonic content in its ac output.

Yet another object of this invention is to provide inverter input circuits which preclude very high dc in-rush currents to the inverter as it is starting or re-starting after a dc power outage.

BRIEF DESCRIPTION OF THE DRAWINGS

These and other features of the present invention are described in more detail hereafter, in association with the accompanying drawings, in which:

FIG. 12 is a basic showing of a bridge-type chopper arrangement of the basic circuit according to this invention;

FIG. 13 shows an alternative commutator choke arrangement;

FIG. 14 shows an alternative feedback arrangement;

FIG. 15 shows yet another alternative feedback arrangement;

FIG. 16 shows an alternative chopper circuit and commutation arrangement;

DESCRIPTION OF THE PREFERRED EMBODIMENTS

As noted above, a major object of this invention is to provide a high reliability inverter circuit which may have either a centre-tapped dc-chopper or a bridge-type dc-chopper. In any event, the inverter has 180 electrical degree SCR control, so that one or another of at least a pair of SCR's is conductive at any instant. The ac output from the inverter circuitry may be fed to a ferroresonant circuit which forms no part of this invention, but which may be similar to that taught in applicant's abovementioned U.S. Pat. No. 3,824,449.

Figure 1:
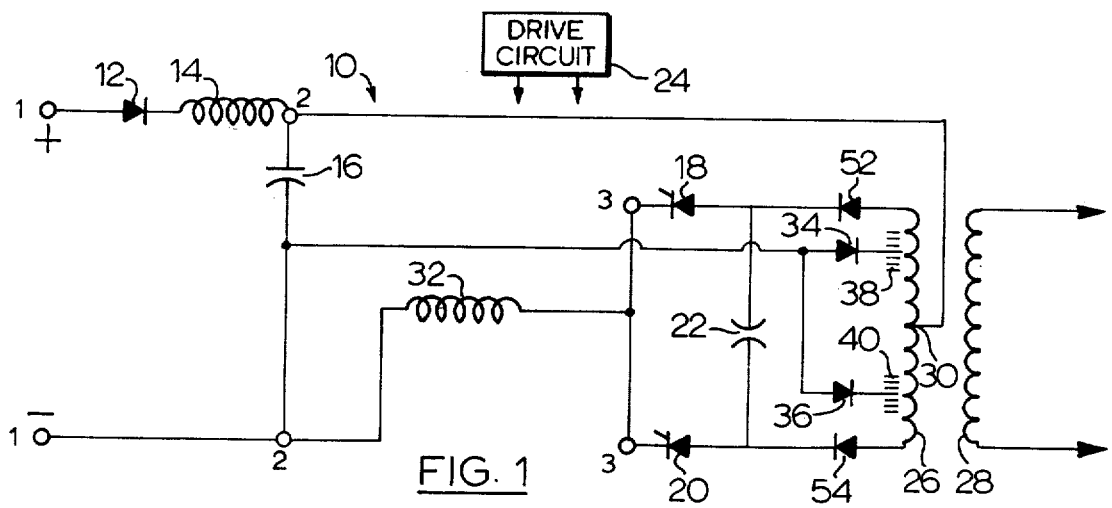
FIG. 1 illustrates a basic circuit in accordance with this invention.

The circuit which is shown in FIG. 1 is a basic circuit with reference to its major features of the present invention, as explained hereafter. There are certain designated pairs of terminals which delineate certain sections or portions of the inverter circuitry, some of which portions or sections are illustrated in other figures of the drawings with the object in mind of showing alternative arrangements for such portions of the circuitry, which might be adapted to other alternative arrangements of other portions of the circuitry still within the ambit of the present invention. Thus, the dc input to the inverter circuitry according to this invention is at terminals 1—1; an input polarized capacitor is across the input at terminals 2—2; and the SCR's in the dc-chopper portion of the inverter circuitry are connected to terminals 3—3.

In the basic circuit 10 illustrated in FIG. 1, an input diode 12 is connected to the direct current source at one of the terminals 1—1, and is arranged so as to be conductive under normal operating conditions of the inverter. An input filter choke 14 is connected in series with the input diode 12, and is therefore in series with the dc input. A polarized capacitor 16 is connected between terminals 2—2, across the direct current input, with the positive side of the polarized capacitor 16 facing the positive side of the dc input.

Figure 2:
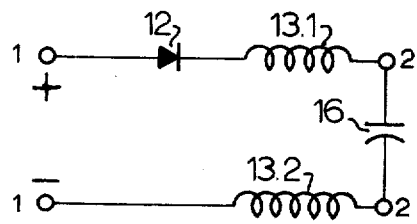
FIG. 2 shows an alternative input portion of the circuit of FIG. 1.

An alternative arrangement of the input section of inverter circuitry according to this invention is illustrated in FIG. 2; and it comprises the input diode 12, a dual input choke 13.1 and 13.2, and the polarized capacitor 16. The input choke 14 of FIG. 1 has therefore been replaced by the dual choke 13.1 and 13.2, which has one coil in series with each side of the dc input at terminals 1—1.

A pair of silicon controlled rectifiers 18 and 20, which are facing in the same direction with respect to the direct current input, are connected to terminals 3—3. Connected between the sides of the SCR's 18, 20 which are remote from the dc source is an unpolarized commutation capacitor 22; and as noted hereafter, the commutation capacitor 22 may be directly connected to the SCR's or connected so as to be facing the sides of the SCR's which are respectively remote from the dc input.

A drive circuit 24 is provided, and is connected to the gates of the SCR's 18 and 20 so as to drive them in a manner such that, at any time, one or the other of the SCR's 18, 20 is conductive. In other words, the drive circuit 24 is connected to the gates of the SCR's 18 and 20 in such a manner that, having regard to the ac output of the dc-chopper which comprises the SCR's, each of the SCR's is driven for 180 electrical degrees with respect to that output. The nature of the drive circuit is not material to the present invention, and the drive circuit may be of any suitable sort which is adapted to drive the SCR's which may have very high power ratings, and which may operate at standard power frequencies such as 60 Hz or 400 Hz.

A chopper transformer is connected with its primary winding 26 on the side facing the SCR's 18 and 20, and its secondary winding 28 facing the ac load on the inverter, or such ferroresonant voltage regulating circuitry or other filter and similar circuitry as might be required. In the circuit of FIG. 1, which shows a centre-tapped dc-chopper; the primary winding 26 is tapped at 30; and the arrangement of the primary winding 26 is such that at any instant at least a portion of the primary winding 26 is in series with whichever of the silicon controlled rectifiers 18 and 20 is conductive at that instant.

Figure 7:
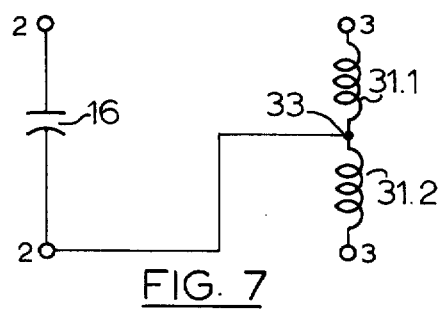
FIG. 7 shows an alternative commutation choke arrangement.

A commutation choke 32 is shown in FIG. 1 in series with the SCR's 18 and 20. An alternative arrangement for the commutation choke 32 is shown in FIG. 7, where a dual choke 31.1 and 31.2 is shown between points 3—3, and is connected at its common point 33 to the negative one of the terminals 2—2 in the same manner as one end of the commutation choke 32 is connected to the negative one of the terminals 2—2 in FIG. 1. Where the commutation choke is a dual choke such as shown in FIG. 7, at least a portion of the commutation choke is in series with each of the SCR's 18 and 20. The commutation choke shown in FIG. 7 may also be a differential choke, a non-linear inductor, a saturable core reactor, a magnetic amplifier, or a flux reset reactor having either single or dual cores and with the winding polarities properly connected so as to preclude high commutation currents.

The basic circuit shown in FIG. 1 has a feedback circuit which comprises a pair of diodes 34 and 36 which are connected to taps 38 and 40 respectively of primary winding 26 of the dc-chopper transformer. It will be noted that taps 38 and 40 are on either side of the centre-tap 30. The diodes 34 and 36 are connected so as to be in counter-polarity to the polarized input capacitor 16 — i.e., the anodes of diodes 34 and 36 as shown in FIG. 1 are connected to the negative side of the polarized capacitor 16. The other side of the diodes, remote from the polarized capacitor, face the primary winding 26 of the transformer.

Figure 4:
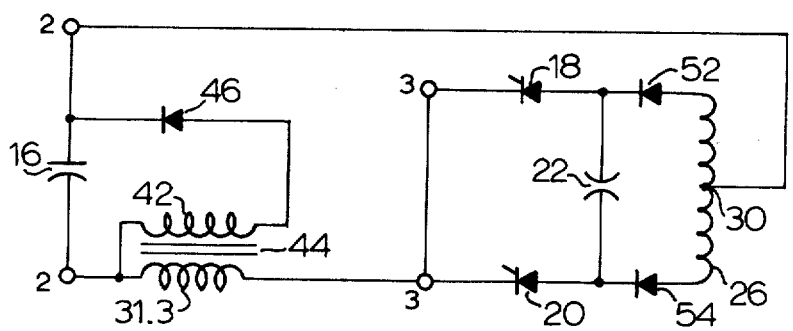
FIG. 4 shows an alternative chopper and feedback arrangement for the circuit of FIG. 1.
Figure 5:
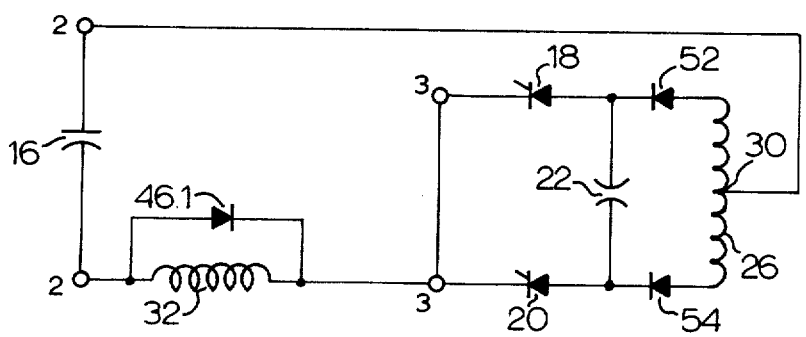
FIG. 5 shows yet another alternative chopper and feedback arrangement.

Alternative feedback arrangements are shown in FIGS. 4 and 5. In FIG. 4, the commutation choke 31.3 has an iron core 44 and a second winding 42 on that core. The coil 42 — which may be considered as a secondary winding on the iron core 44 — is in series with a single feedback diode 46 which is connected to the polarized capacitor 16 in counter-polarity thereto. That is to say, the anode of feedback diode 46 is connected to the positive side of the polarized input capacitor 16.

Yet another alternative feedback arrangement is shown in FIG. 5, where a feedback diode 46.1 is connected across the commutator choke 32. Once again, the feedback diode 46.1 is connected to the polarized capacitor 16 in counter-polarity thereto, with the anode of the diode being connected to the negative side of the polarized capacitor. The feedback arrangement of FIG. 5 is less efficient with respect to power recovery than the feedback arrangements illustrated in FIGS. 1 and 4, and leads to heating of the choke 32.

With respect to any of the feedback arrangements discussed above, it will be seen that the feedback circuit is a closed diode loop within the inverter, isolated from the load and independent thereof. The operation of the feedback circuits is premised on the fact that the inverter operation can accommodate an inductive to resistive load, and that in any event there is an inductive reactance commutation choke in series with the SCR's, or at least in series with the SCR which is conducting at any instant in time.

In the preferred arrangement of the SCR's 18 and 20 with respect to the primary winding 26 of the centre-tapped chopper transformer, the SCR's 18 and 20 are de-coupled therefrom — and thus from the load as it may be reflected into the primary winding — by diodes 52 and 54. The de-coupling diodes are connected to the primary winding, in this instance, so as to have 100% of the primary winding between their connection points; and they are facing in the same direction as the SCR's 18 and 20. De-coupling diode 52 is in series with SCR 18, and de-coupling diode 54 is in series with SCR 20. The commutation capacitor 22 is connected between the common points of the series connections of diode 52 and SCR 18 and of diode 54 and SCR 20, so that the commutation capacitor 22 is de-coupled from the primary winding 26 of the chopper transformer by the de-coupling diodes 52 and 54. Thus, the 180 electrical degree commutation of the inverter circuitry of the present invention is not influenced by the power factor of the load on the inverter, or the transformer inductance. Therefore, instantaneous current and voltage stresses in the commutation circuit are substantially constant, and may be predicted and designed for.

What has been discussed, so far, are the basic components of inverter circuits according to this invention, where an inverter is provided which is substantially fail-safe, particularly with respect to commutation failure due to heavy load switching; and which is also substantially free of the effects of variation of the dc input voltage, or of power factor or changing power factor of the ac load. The dc input is completely isolated from the ac output, as is the feedback loop. Because of the 180 electrical degree fixed firing of the SCR's, it is possible to obtain an output frequency from the inverter circuits according to this invention which is independent of the ac load or of the dc input voltage level.

The reactive load which is reflected into the primary winding of the chopper transformer is fed back and recovered as rectified, dc power, by use of the feedback circuits discussed above. The efficiency of the inverter circuits is thereby increased.

Figure 3:
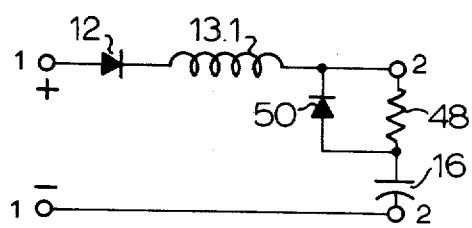
FIG. 3 shows yet another alternative input portion of the circuit of FIG. 1.

Another major innovation which may be added to the inverter circuitry of the present invention is the input circuit shown in FIG. 3. That circuit provides for a soft-start as the inverter first begins operation or recovers after a complete power outage, and comprises a resistor 48 in series with the polarized input capacitor 16 and a diode 50 connected in counter-polarity to the dc input and in parallel with the resistor 48. Thus, the cathode of the diode 50 faces the cathode of the input diode 12, and the anode of the diode 50 faces the positive side of the polarized capacitor 16. By this arrangement, even when the full ac load is connected to the inverter at the startup, dc in-rush currents may be limited to from 3 to 6 times nominal dc current during operation with that load, while at the same time permitting a startup of the inverter in as few as 4 cycles of operation thereof.

In the event of failure of the dc input, the input diode 12 prevents discharge of the capacitor 16 backwards to the dc source. During startup, as the capacitor 16 is being charged, high in-rush currents cause a voltage drop across the resistor 48 up to the clamping level of the diode 50, whereby current limiting is effected. The input circuitry of FIG. 3, when associated with an inverter — particularly according to this invention — thereby assures a "soft start" i.e. that extremely high in-rush currents are precluded.

When the inverter circuit is first connected to its dc power source, or in the event of a momentary or even prolonged interruption of the dc power source, a fast and soft start or re-start is assured by the circuit of FIG. 3 — and in the event of short dc power interruptions, a substantially continuous ac output is assured. At startup, the firing pulses for the SCR's are firmly established by the firing circuit. When the inverter circuitry has been operating for a short period of time, the time constant of the LC filter which comprises the input choke 14 and the input capacitor 16 is long, so that when the capacitor 16 has been fully charged, operation of the dc-chopper circuit is maintained over a few cycles of operation as determined by the time constant of the LC filter. Also, the isolating diode 12 precludes feedback of energy from the input capacitor 16 to the dc source in the event that the voltage of the dc source fails or collapses.

It should be noted that, in the present discussion in association with the drawings, it is understood that connections of the SCR's or other components — particularly such as feedback diodes or de-coupling diodes — which are made to the primary winding of the chopper transformer, may be made at taps such as illustrated in FIG. 1 at 38 and 40. Such taps are normally arranged so as to provide from 60 to 100% of the primary voltage between them. It should also be noted that an overwind coil may also be placed on the primary winding or the transformer, as discussed hereafter with respect to FIGS. 8, 9 and 17. As mentioned previously, the secondary winding 28 of the chopper transformer, whose output is substantially sinusoidal, may be connected to voltage regulator or other circuits such as taught in the aforementioned U.S. Pat. No. 3,824,449.

Figure 6:
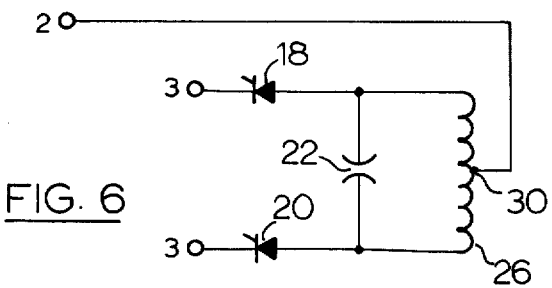
FIG. 6 shows an alternative chopper arrangement.

FIG. 6 shows an un-decoupled dc-chopper circuit, where the SCR's 18 and 20 are directly coupled to the primary winding 26 of the chopper transformer. However, in order that there be good operation of the circuit, large commutation capacitors 22 may be required; especially if there is a highly inductive load, which may otherwise result in incomplete or faulty commutation — all of the reactive power being absorbed by the capacitors — and heating of the chopper transformer.

Figure 8:
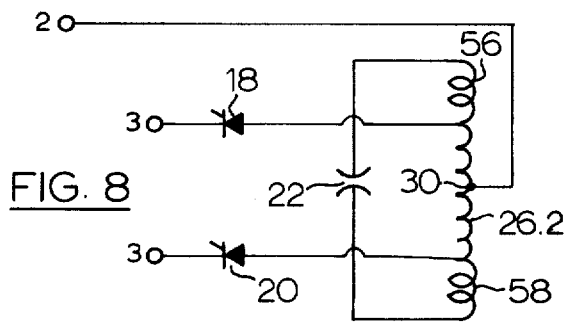
FIG. 8 shows an alternative commutation capacitor arrangement.

FIG. 8 illustrates yet another alternative arrangement for the commutation capacitor 22 in a direct-coupled chopper whereby lower average commutation currents may be achieved. In this circuit, the SCR's 18 and 20 are directly coupled the primary winding 26.2, and an overwind coil having coil portions 56 and 58 is placed on the primary winding 26.2 so that the portions 56 and 58 are in series therewith. The commutation capacitor 22 is connected across the overwind coil and the primary winding.

Figure 9:
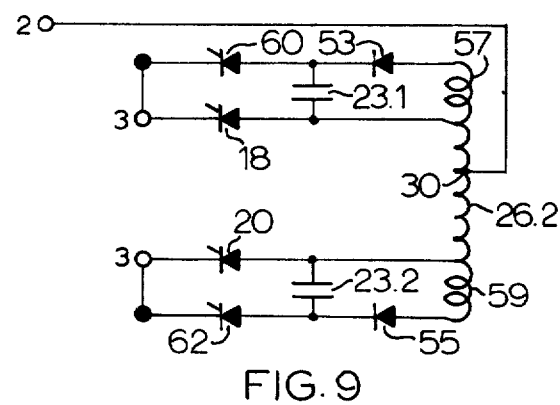
FIG. 9 shows another alternative chopper arrangement having forced commutation.

The circuit of figure 9 is one in which the SCR's 18 and 20 are joined by a second pair of SCR's 60 and 62, where SCR 60 is in parallel with SCR 18 and SCR 62 is in parallel in SCR 20. SCR's 60 and 62 face in the same direction as SCR's 18 and 20. The gates of the SCR's 60 and 62 are connected to the same drive circuit 24 as the gates of SCR's 18 and 20, and they are connected in such a manner so that when SCR 18 is fired, SCR 62 is fired; and when SCR 20 is fired, SCR 60 is fired. That is, the connection of SCR's 18, 20 60 and 62 is such that one of each of the pairs of SCR's 18, 20, and 60, 62 is always conductive. A pair of capacitors 23.1 and 23.2 is connected so that one of each of the capacitors is between one each of the pairs of SCR's 18, 20 and 60, 62, as shown. The SCR's 18 and 20 are connected to the primary winding 26.2, and the SCR's 60 and 62 are connected through diodes 53 and 55 to the outer ends of portions 57 and 59 respectively of an overwind coil which is placed on the primary winding 26.2. The circuit of FIG. 9 is an auxilliary commutated dc-chopper, i.e., one having forced commutation; and in this circuit commutation is forced, regardless of the load on the inverter. The capacitors 23.1 and 23.2, and the diodes 53 and 55, provide a bias network for the auxilliary SCR's 60 and 62. Preferably the terminals 3-3 are connected to the dual coils of a differential commutation choke, as shown in FIG. 7.

Figure 10:
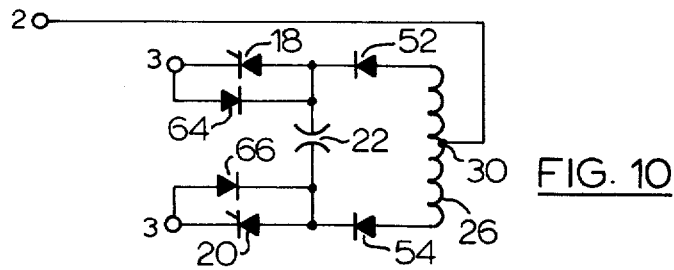
FIG. 10 shows yet another chopper arrangement.

The circuit which is shown in FIG. 10 is a basic, de-coupled chopper circuit, except that commutation diodes 64 and 66 are connected in parallel across SCR's 18 and 20 respectively, and in counter-polarity thereto. The commutation diodes 64 and 66 may be used to reduce the voltage stress across the SCR's 18 and 20 during commutation.

Figure 11:
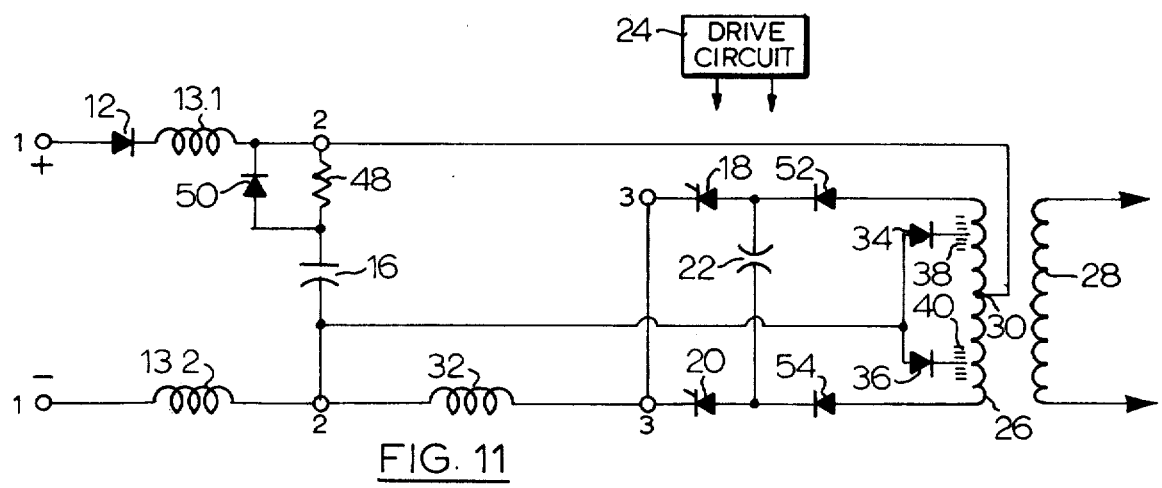
FIG. 11 is the circuit of a preferred embodiment of a centre-tapped chopper arrangement according to this invention.

The circuit which is shown in FIG. 11 is a preferred embodiment of an inverter circuit according to this invention having 180 electrical degree commutation and a centre-tapped chopper transformer. It will be noted that the circuit includes the isolating diode 12, input chokes 13.1 and 13.2, polarized input capacitor 16 and the soft-start circuitry in series with capacitor 16, namely resistor 48 and diode 50. The commutator choke 32 is in series with SCR's 18 and 20, de-coupling diodes 52 and 54 are in series with SCR's 18 and 20 respectively and the commutating capacitor 22 is de-coupled from the primary winding 26 of the chopper transformer. The feedback circuit includes diodes 34 and 36 connected from taps 38 and 40 respectively of the primary winding 26, and connected in counter-polarity to the input polarized capacitor 16. The operation of the circuit of FIG. 11 is as discussed above.

Turning now to FIG. 12, there is shown an alternative basic circuit of the present invention, having a bridge-type dc-chopper rather than the centre-tapped chopper arrangement of the circuits of FIGS. 1, 4 to 6, and 8 to 11. The operation of the circuit of FIG. 12 is essentially the same as the operation of the circuit of FIG. 1; and indeed the circuit of FIG. 12 includes the isolating diode 12, input filter choke 14 and input polarized capacitor 16 across the dc source. SCR's 18.1 and 20.1, which face in the same direction with respect to each other, are connected so that each of the SCR's is across the primary winding 26 of the chopper transformer. However, a further pair of SCR's 68 and 70 is also connected in parallel with each other and facing in the same direction with respect to each other, and across the primary winding 26 so that SCR's 20.1 and 68 are connected to one end of the primary winding 26, and SCR's 18.1 and 70 are connected to the other end of the primary winding 26. A pair of commutation capacitors 22.1 and 22.2 are connected so that each is across the primary winding 26, with commutation capacitor 22.1 being connected between SCR's 18.1 and 20.1 and commutation capacitor 22.2 being connected between SCR's 68 and 70. The drive circuit 24.1 is connected to the gates of the SCR's in a manner so that one of each of the pairs of SCR's 18.1, 20.1 and 68, 70 is always conductive and so that the primary winding 26 is always in the circuit. Thus, SCR's 18.1 and 68 are fired at the same time, and SCR's 20.1 and 70 are fired at the same time; and 180 electrical degree commutation is again achieved by the choppered circuit of FIG. 12.

The commutation choke arrangement in FIG. 12 includes a commutation choke 32.1 connected to terminals 3a—3a and in series with the pair of SCR's 18.1, 20.1; and commutation choke 32.2 connected to terminals 3b—3b, and in series with the pair of SCR's 68 70.

The feedback arrangement from the primary winding 26 of the chopper transformer in the circuit of FIG. 12 includes a dc bridge as shown in FIG. 12, or it may include at least two diodes connected in counter-polarity with respect to the input polarized capacitor 16, as discussed hereafter in association with FIGS. 14 and 15. In any event, the feedback circuit shown in FIG. 12 includes a bridge having diodes 72, 74, 76 and 78 which are connected in such a manner that the cathodes of diodes 72 and 78 are connected to the positive side of polarized capacitor 16, and the anodes of diodes 74 and 76 are connected to the negative side of the polarized capacitor 16. The bridge connections 73 and 77 which are between diodes 72 and 74 and diodes 76 and 78 respectively are connected to taps 38.1 and 40.1 of the primary winding 26 of the chopper transformer.

De-coupling diodes 52.1 and 54.1 are in series with SCR's 18.1 and 20.1, respectively, and de-coupling diodes 80 and 82 are in series with SCR's 68 and 70, respectively. The commutation capacitors 22.1 and 22.2 are, in each case, de-coupled from primary winding 26 of the chopper transformer.

Referring to FIGS. 14 and 15, they illustrate comparable feedback circuits for a bridge-type chopper as the feedback circuits which are illustrated in FIGS. 4 and 5 respectively for the centre-tapped chopper circuit version of the inverter circuitry of the present invention. Thus, the commutator chokes 32.1 and 32.2 of FIG. 12 are replaced by a first dual choke having an iron core 44.1 and primary and secondary windings 32.3 and 32.4 and a second similar choke having an iron core 44.2 and primary and secondary windings 32.5 and 32.6 respectively. The windings 32.3 and 32.4 are connected to terminals 3a—3a, and the windings 32.5 and 32.6 are connected to the terminals 3b—3b. The ends of windings 32.4 and 32.6 which are moved from terminals 3a—3a and 3b—3b respectively are connected to feedback diodes 46.2 and 46.3 respectively, each of which is then connected to the input polarized capacitor 16 in counter-polarity thereto.

In the circuit of FIG. 15, which shows a low efficiency feedback arrangement similar to that of FIG. 5, feedback diodes 46.4 and 46.5 are connected in counter-polarity to the input polarized capacitor 16 and across the commutator chokes 32.1 and 32.2 respectively.

Figure 18:
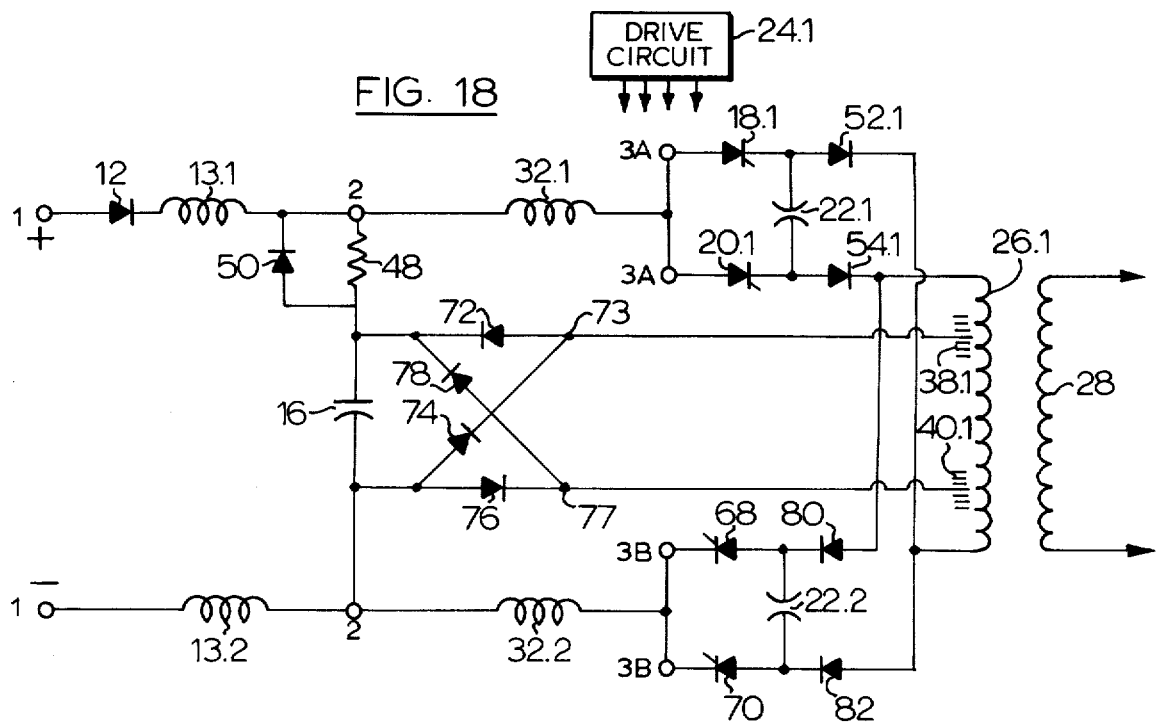
FIG. 18 is the circuit of a preferred embodiment of a bridge-type chopper arrangement according to this invention.

Needless to say, the input circuit arrangement of FIGS. 2 and 3 can be utilized in the input of FIG. 12, and are shown in FIG. 18 which shows a preferred circuit of the bridge-type chopper version of the inverter circuitry according to the present invention, in a similar manner as the circuit of FIG. 11 shows a preferred circuit of a centre-tapped chopper arrangement, as discussed above.

FIG. 13 shows the use of dual chokes having windings 31.3 and 31.4 to replace commutator choke 32.1 of FIG. 12, and windings 31.5 and 31.6 to replace commutator choke 32.2 of FIG. 12. The operation of the circuit of FIG. 14 is otherwise identical with that of the circuit of FIG. 7.

The circuit of FIG. 16 is similar to the circuit of FIG. 8, except that it is adapted for use with a bridge-type chopper, and shows a direct-coupled chopper circuit with a single, direct-coupled commutator capacitor 22.3 connected across the primary winding 26.1 which has an overwind coil with portions 56.1 and 58.1 thereon. Once again, the operation of the circuit of FIG. 16 is similar to the operation of the circuit of FIG. 8, as discussed above.

Figure 17:
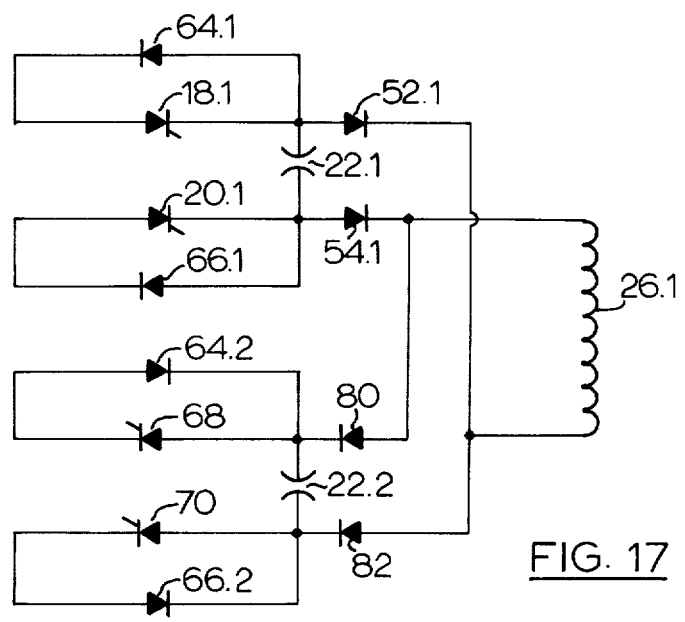
FIG. 17 shows a further alternative chopper arrangement.

The circuit of FIG. 17 shows the bridge-type version of the circuit of FIG. 10. That is, the circuit of FIG. 17 includes two pairs of commutation diodes 64.1, 66.1 and 64.2, 66.2 respectively, which are connected in parallel but in counter-polarity to SCR's 18.1, 20.1, 68 and 70 respectively.

As mentioned above, the circuit of FIG. 18 shows the preferred embodiment of a bridge-type inverter circuit according to this invention, including a similar input circuit to that of FIG. 11, a de-coupled bridge-type chopper with de-coupled commutator capacitors and a bridge-type feedback from the primary winding of the chopper transformer.

Obviously, because of the time constant of the LC circuit comprising the commutation choke and the commutation capacitors in the chopper circuits discussed above, and because of the 180 electrical degree commutation, relatively low average power is consumed in the firing pulse of each SCR. Reliable commutation is also assured.

Because the control of the inverter circuitry discussed above in independent of the load, and in most cases the commutation capacitors are de-coupled from the chopper transformer, two or more inverters of the present invention can be parallel connected where the only requirement for a common control between the parallel inverters is requirement for common firing of the SCR's. This may be arranged through the use of a single oscillator or a dual, redundant oscillator, slave firing or through synchronization of the drive circuits to an ac line.

Another possibility of multiple connections of inverters according to the present invention is in a multiphase system such as a three-phase power system. In that instance, three dc-chopper circuits which are displaced 120 electrical degrees from one another are parallel-connected, operating from a common dc source, with their ac outputs being fully isolated and connected in a three-phase wye output having either three or four wires. In this manner, reliable three-phase inverter circuitry is assured even when the phases are imbalanced; and fixed frequency operation which is independent both of the load and of the dc power source is provided.

In like manner, because of the fixed frequency output and because the operation of the chopper circuits is independent of the load or of the dc source, having 180 electrical degree commutation, it is possible to provide two or more output circuits from a single chopper. For example, a single phase 120-0-120 volt system may easily be provided, using two ferroresonant regulated a-c output circuits.

The inverter circuitry of the present invention provides reliable operation, using off-the-shelf components. The ac output voltage of the inverter circuitry of the present invention is regulated by closed-loop dc feedback and may be arranged with remote sensing means to provide very precise output control at the load terminals where such loads are voltage sensitive. The response time of the inverter circuitry according to the present invention is within one to three cycles of chopper operation. Because of the LC circuit provided by the commutator choke and the commutator capacitors, low overshoot or undershoot is assured, hunting is reduced, and RF or high harmonic distortion is essentially precluded.

At the same time, inverter circuitry according to the present invention, because of the input choke and polarized input capacitor, is capable of operating from unclean or unfiltered dc source, possibly having high harmonic content. Further, the input circuit including the isolating diode is such as to prevent or suppress feedback of harmonics from the dc-chopper to the dc source, and also to prevent electrical noise such as RF interference in the dc input circuits.

If any fault occurs in the chopper circuits of the present invention, the fault current which may result therefrom cannot be instantly reflected into either the ac output or the dc input to the inverter because of the inherent time constants of the commutation LC circuit or the input LC circuit. Thus, when several inverters according to this invention are operating in parallel, individual inverters may be switched into or out of the ac system or connected or dis-connected from the dc system without interruption or disturbance. Indeed, in the case of failure of an inverter, that inverter can be isolated from the ac and dc systems to which it was otherwise connected by means of conventional breakers or contactors which, however, can operate with "before the fact" fault sensing. Such a system can operate by sensing the failure of an SCR to fire, for example, at a time while there is still an ac output from the inverter due to the time constant of the ac output filter.

The commutator chokes which may be used in inverters according to the present invention may be linear or non-linear reactors, or they may have a differential or centre-tapped design such as contemplated in the circuits of FIGS. 7 and 14. Peak commutation inrush current may also be smoothed out by inserting a small inductance such as an air choke in series with the commutation capacitor.

The operating characteristics of feedback diodes can be predicted and therefore optimized, when the characteristics of the ac regulator circuit are known. In like manner, the operating characteristics of the SCR's may be optimized especially when they are de-coupled from the primary winding of the transformer, and off-the-shelf components may be used throughout.

Additional regulating circuits may be connected to the inverter circuits of the present invention, if desired. Other modifications and amendments may be made, without departing from the spirit and scope of the appended claims.

I claim:

1. In an inverter circuit having a direct current input and an alternating current output, the combination comprising:
   a. an input diode connected to said direct current source with its polarity arranged so as to be conductive under normal operating conditions of said inverter;
   b. an input filter choke in series with said direct current input and said input diode;
   c. a polarized capacitor across said direct current input and said input diode and input choke, with the positive side of said capacitor facing the positive side of said direct current source;
   d. a pair of silicon controlled rectifiers facing in the same direction with respect to said direct current input, and an unpolarized commutation capacitor connected so as to be facing the side of each of said silicon controlled rectifiers which is remote from said direct current source;
   e. a drive circuit connected to the gates of said silicon controlled rectifiers so as to drive said silicon controlled rectifiers in a manner so that, at any time, one or the other of them is conductive;
   f. a transformer having a primary and a secondary winding, where said primary winding is connected so that at any instant at least a portion thereof is in series with the silicon controlled rectifier which is conductive at that instant, and where said alternating current output is from said secondary winding;
   g. a pair of de-coupling diodes, each connected to said primary winding so as to have 100% of the primary winding between their connection points, the other sides of said de-coupling diodes being connected to said silicon controlled rectifiers so that one de-coupling diode and one silicon controlled rectifier are in series at each end of said primary winding; said unpolarized commutating capacitor being connected between the common points of each of said series connections of said de-coupling diodes and said silicon controlled rectifiers;
   h. a commutation choke in series with said silicon controlled rectifiers and connected so that each of said silicon controlled rectifiers is in series with at least a portion of said commutation choke;
   i. and a feedback circuit comprising at least one diode arranged so as to be in counter-polarity to said polarized capacitor and connected to the opposite polarity side of said polarized capacitor at one side of said diode, and facing the primary winding of said transformer at the other side of said diode;

said inverter circuit thereby having fixed frequency, 180 electrical degrees, direct current commutation, where the commutation is independent of the load conditions on said inverter; and said inverter further having closed loop feedback which is electrically isolated from the load on said inverter.

2. The inverter circuit of claim 1 where said input choke is a dual choke with one coil in series with each side of said direct current input.

3. The inverter circuit of claim 1, further comprising a resistor in series with said polarized capacitor; and a diode connected in counter-polarity to said direct current input and in parallel with said resistor.

4. The inverter circuit of claim 3 where said primary winding of said transformer is centre-tapped, with the centre tap in series with one side of said direct current input, and with the ends of said primary winding being each in series with one of said silicon controlled rectifiers.

5. The inverter circuit of claim 4 where said commutation choke has a single coil portion.

6. The inverter circuit of claim 4 where said commutation choke has two coil portions, one of each of which is in series with one of said silicon controlled rectifiers.

7. The inverter circuit of claim 4 where said feedback circuit comprises two feedback diodes each connected to said primary winding so as to have 60 to 100% of the primary winding between their connection points, the other sides of said feedback diodes being connected to each other and to said polarized capacitor.

8. The inverter circuit of claim 4 where said commutation choke comprises a dual coil on an iron core with one coil as a secondary winding; said primary winding being in series with a common connection of said silicon controlled rectifiers; and where said feedback circuit comprises said choke coil secondary winding in series with said common connection and with a feedback diode which is connected to said polarized capacitor in counter-polarity thereto.

9. The inverter circuit of claim 4 where said commutation choke comprises a coil in series with a common connection of said silicon controlled rectifiers; and where said feedback circuit comprises a feedback diode connected across said coil between said common connection and said polarized capacitor, and connected to said polarized capacitor in counter-polarity thereto.

10. The inverter circuit of claim 4 where said de-coupling diodes are replaced by an overwind coil on said primary winding of said transformer, and said unpolarized commutation capacitor is connected across said overwind coil and said primary winding.

11. The inverter circuit of claim 4 further comprising a second pair of silicon controlled rectifiers, each one of said pair being in parallel with one of said first-mentioned pair of silicon controlled rectifiers and facing in the same direction thereas; where the gates of all of said silicon controlled rectifiers are connected to said drive circuit in a manner so that one of said first-mentioned pair of silicon controlled rectifiers and the one of said second pair of silicon controlled rectifiers which is in parallel with the other of said first-mentioned pair of silicon controlled rectifiers, are driven so as to be conductive at the same time, and so that one or the other of each of said pairs of silicon controlled rectifiers is always conductive;

the side of each of said second pair of silicon controlled rectifiers which is remote from said commutation choke being connected to one of the ends of an overwind coil on said primary winding of said transformer;

and a pair of capacitors, each connected between the ends of one of each of said first-mentioned silicon controlled rectifiers and the one of said second pair of silicon controlled rectifiers which is parallel thereto, so that each of said silicon controlled rectifiers is between said one of said unpolarized capacitors and said commutation choke.

12. The inverter circuit of claim 4 further including a pair of commutation diodes each connected so as to be in parallel with and in counter-polarity to one of said silicon controlled rectifiers.

13. In an inverter circuit having a direct current input and an alternating current output, the combination comprising:
 a. an input diode connected to said direct current source with its polarity arranged so as to be conductive under normal operating conditions of said inverter;
 b. an input filter choke in series with said direct current input and said input diode;
 c. a polarized capacitor across said direct current input and said input diode and input choke, with the positive side of said capacitor facing the positive side of said direct current source;
 d. a pair of silicon controlled rectifiers facing in the same direction with respect to said direct current input, and an unpolarized commutation capacitor connected so as to be facing the side of each of said silicon controlled rectifiers which is remote from said direct current source;
 e. a drive circuit connected to the gates of said silicon controlled rectifiers so as to drive said silicon controlled rectifiers in a manner so that, at any time, one or the other of them is conductive;
 f. a transformer having a primary and a secondary winding, where said primary winding is connected so that at any instant at least a portion thereof is in series with the silicon controlled rectifier which is conductive at that instant, and where said alternating current output is from said secondary winding;
 g. a pair of de-coupling diodes, each connected to said primary winding so as to have 100% of the primary winding between their connection points, the other sides of said de-coupling diodes being connected to said silicon controlled rectifiers so that one de-coupling diode and one silicon controlled rectifier are in series at each end of said trolled primary winding; said unpolarized commutating capacitor being connected between the common points of each of said series connections of said de-coupling diodes and said silicon controlled rectifiers;
 h. a commutation choke in series with said silicon controlled rectifiers and connected so that each of said silicon controlled rectifiers is in series with at least a portion of said commutation choke;
 i. a feedback circuit comprising at least one diode arranged so as to be in counter-polarity to said polarized capacitor and connected to the opposite polarity side of said polarized capacitor at one side of said diode, and facing the primary winding of said transformer at the other side of said diode;
 j. a further pair of silicon controlled rectifiers facing in the same direction with respect to each other and in series following with respect to said first-mentioned pair of silicon controlled rectifiers so as to form a bridge circuit having said first pair of silicon controlled rectifiers as first and second legs and said further pair of silicon controlled rectifiers as third and fourth legs, respectively; said primary winding of said transformer being connected across said bridge circuit so that one of each of said first pair and said further pair of silicon controlled rectifiers is connected to each end of said primary winding;
 k. a further unpolarized commutation capacitor connected so as to be facing the side of each of said further pair of silicon controlled rectifiers which is remote from said direct current source;
 l. the sides of each of said first-mentioned and said further commutation capacitors being connected to each face one end of the primary winding of said transformer;
 m. the gates of said further pair of silicon controlled rectifiers being connected to said drive circuit in a manner so that, at any time, one of each of said first-mentioned pair and said further pair of silicon controlled rectifiers is conductive;
 n. a further commutation choke in series with said further pair of silicon controlled rectifiers and connected so that each of said further pair of silicon controlled rectifiers is in series with at least a portion of said further commutation choke;
 o. said feedback circuit comprising at least two feedback diodes arranged so that each of them is connected to one or the other side of said polarized capacitor in counter-polarity thereto, at one side of each of said feedback diodes; and so that the other side of each of said feedback diodes faces the primary winding of said transformer;
 p. and two pairs of de-coupling diodes, each of said pairs being connected to said primary winding so as to have 100% of the primary winding between their respective connection points, the other sides of said de-coupling diodes being connected to said silicon controlled rectifiers so that one de-coupling diode and one silicon controlled rectifier from each pair of diodes and silicon controlled rectifiers are in series at each end of said primary winding; and where each said unpolarized commutation capacitor is connected between the common points of said series of connections of said de-coupling diodes and first-mentioned pair of silicon controlled rectifiers and said further pair of silicon controlled rectifiers, respectively.

14. The inverter circuit of claim 13 where said input choke is a dual choke with one coil in series with each side of said direct current input.

15. The inverter circuit of claim 13, further comprising a resistor is series with said polarized capacitor; and a diode connected in counter-polarity to said direct current input and in parallel with said resistor.

16. The inverter circuit of claim 15 where each of said commutation chokes has a single coil portion.

17. The inverter circuit of claim 15 where each of said commutation chokes has two coil portions, one of each of which is in series wiht one each of said first-mentioned silicon controlled rectifiers and said further pair of silicon controlled rectifiers, respectively.

18. The inverter circuit of claim 15 where said feedback circuit comprises two pairs feedback diodes where each pair of feedback diodes is connected to said primary winding so as to have 60 to 100% of the primary winding between their respective connection points; the other sides of each of said pairs of feedback diodes being connected to said polarized capacitor so that one of each of said pairs of feedback diodes is connected to each side of said polarized capacitor and in counter-polarity thereto.

19. The inverter circuit of claim 15 where said commutation chokes each comprises a dual coil on an iron core with one coil as a secondary winding; each of said primary windings being in series with a common connection of one of said first-mentioned pair of silicon controlled rectifiers; and said further pair of silicon controlled rectifiers, respectively; and where said feedback circuit comprises each of said choke coil secondary windings in series with one of said common connections and with a feedback diode which is connected to one side of said polarized capacitor in counter-polarity thereto.

20. The inverter circuit of claim 13 where each of said commutation chokes comprises a coil in series with a common connection of one of said first-mentioned pair of silicon controlled rectifiers and said further pair of silicon controlled rectifiers, respectively; and where said feedback circuit comprises a feedback diode connected across each said commutation choke coil between the respective one of said common connections and said polarized capacitor, and connected to said polarized capacitor in counter-polarity thereto.

21. The inverter circuit of claim 13 where said decoupling diodes are replaced by an overwind coil on said primary winding of said transformer, and a single unpolarized commutation capacitor is connected across said overwind coil and said primary winding.

22. The inverter circuit of claim 13, further including two pairs of commutation diodes each connected so as to be in parallel with and in counter-polarity to one each of said first-mentioned pair of silicon controlled rectifiers and said further pair of silicon controlled rectifiers, respectively.

* * * * *